United States Patent [19]

Orimo et al.

[11] Patent Number: 4,797,885
[45] Date of Patent: Jan. 10, 1989

[54] DISTRIBUTED PROCESSING SYSTEM AND METHOD

[75] Inventors: Masayuki Orimo, Kawasaki; Kinji Mori, Yokohama; Yasuo Suzuki, Ebina; Minoru Koizumi, Yokohama; Katsumi Kawano, Fuchu; Hirokazu Kasajima, Hitachi; Kozo Nakai, Katsuta, all of Japan

[73] Assignee: Hitachi, Ltd., Tokyo, Japan

[21] Appl. No.: 940,495

[22] Filed: Dec. 10, 1986

[30] Foreign Application Priority Data

Dec. 11, 1985 [JP] Japan .................. 60-281418

[51] Int. Cl.$^4$ ............................................. G06F 11/22
[52] U.S. Cl. ............................ 371/19; 371/16; 371/25
[58] Field of Search .................. 371/19, 16, 25, 18, 371/17, 21, 20; 364/200, 900; 365/222

[56] References Cited

U.S. PATENT DOCUMENTS

| | | | |
|---|---|---|---|
| 4,204,251 | 5/1980 | Brudevold | 364/200 |
| 4,429,368 | 1/1984 | Kurii | 371/19 |
| 4,507,727 | 3/1985 | Mager | 364/200 |
| 4,622,668 | 11/1986 | Dancker | 371/21 |
| 4,672,534 | 6/1987 | Kamiya | 371/16 |

Primary Examiner—Michael R. Fleming
Attorney, Agent, or Firm—Antonelli, Terry & Wands

[57] ABSTRACT

In a processing system including a plurality of processing units connected to a common transmission line, the improvement for permitting program tests under on-line environments characterized in that each of the processing units decides whether or not a program loaded in its own processing unit is a program to be tested, establishes a test mode when the program is to be tested, processes the program irrespective of whether or not the program is in the test mode, data of a test result being generated on the basis of data of a processed result when the program is in the test mode, and delivers the results to the common transmission line.

8 Claims, 10 Drawing Sheets

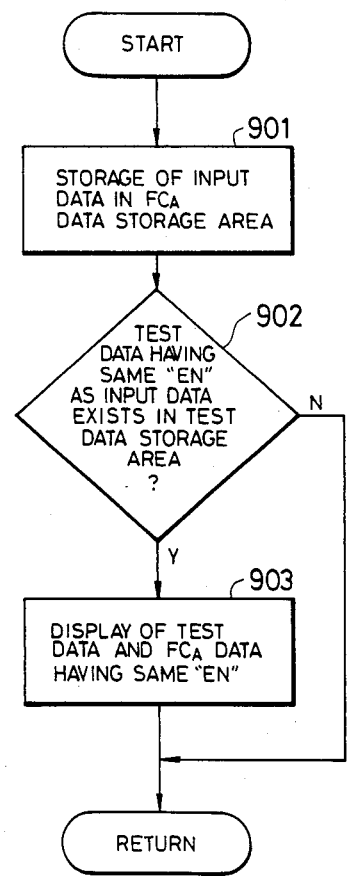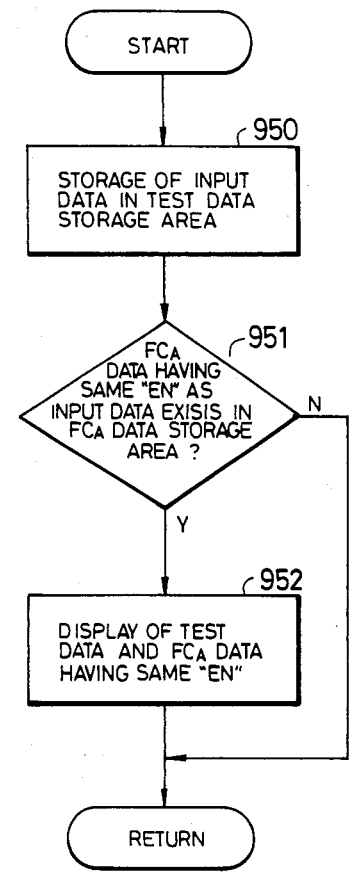

DISTRIBUTED PROCESSING SYSTEM AND METHOD

BACKGROUND OF THE INVENTION

1. Field of the Invention

The present invention relates to a distributed processing system. More particularly, it relates, in a distributed processing system including a plurality of processing units to a distributed processing system and method which permit application program tests under on-line circumstances.

2. Description of the Prior Art

In a distributed processing system including a plurality of processing units connected to a common transmission line, a method in which a program for executing each of a series of processes is started when data items necessary for executing the program have been completely received from the transmission line into a processing unit is disclosed in the official gazette of Japanese patent application Laid-open No. 57-146361. This method makes it possible to execute the series of processes by the respective processing units without requiring an executive processor for managing the whole system. However, it does not have means for testing programs developed in order to be loaded in the respective processing units by the use of on-line data and deciding whether they are normal or abnormal under on-line circumstances.

Some conventional systems other than the distributed processing system have means for gathering the result data of program processes. However, such means functions merely to take the logarithms of the data in time sequence and has been unsatisfactory for analyzing test results with the gathered results.

SUMMARY OF THE INVENTION

An object of the present invention is to eliminate the problem of the prior-art distributed processing system as stated above, and has for its object to provide, in a system wherein processes are executed by respective processing units without requiring an executive processor for managing the whole system, a distributed processing system and method which permit program tests under on-line circumstances.

The present invention for accomplishing this object, in a distributed processing system including a plurality of processing units connected to a common transmission line, consists of a distributed processing system and method characterized in that each processing unit decides whether or not a program loaded in its own processing unit is a program to be tested, establishes a test mode when the program is to be tested, processes the program irrespective of whether or not the program is in the test mode, data of a test result being generated on the basis of data of a processed result when the program is in the test mode, and delivers the results to the common transmission line.

BRIEF DESCRIPTION OF THE DRAWINGS

FIGS. 8(a) and 8(b), and FIGS. 9(a)–9(c) are diagrams for explaining test data gathering processes.

DETAILED DESCRIPTION OF THE PREFERRED EMBODIMENT

Figure 1:
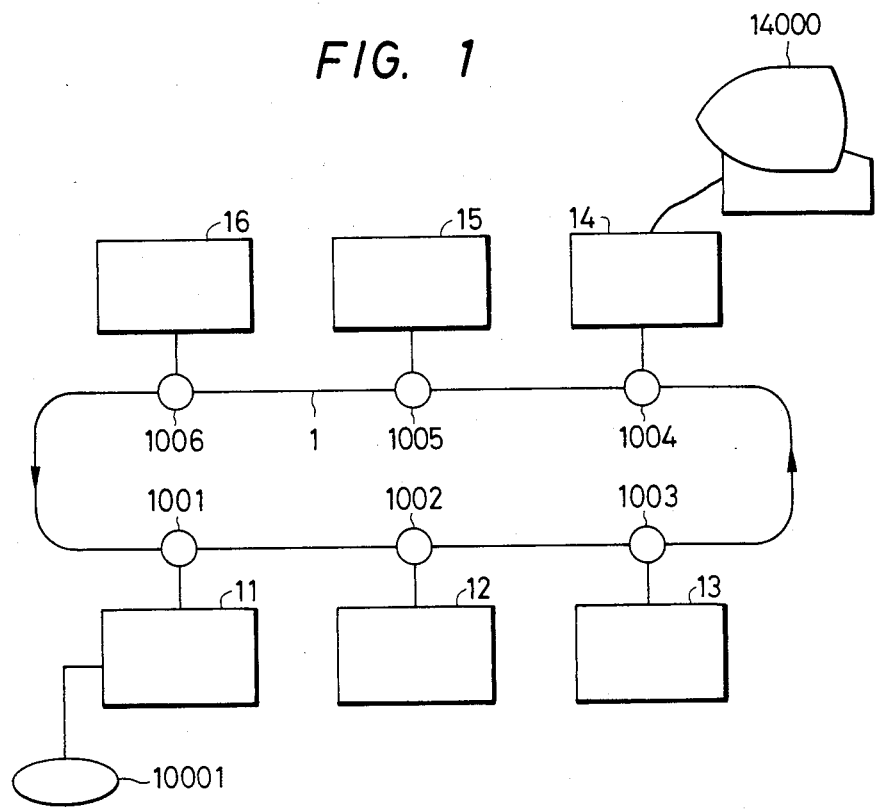
FIG. 1 is a diagram showing a system architecture which is an embodiment of the present invention.

FIG. 1 is a general architectural diagram of a system to which the present invention is applied. Referring to the figure, numerals 11–16 designate processors each of which stores an application program in the internal memory thereof and operates to execute that program, and numeral 1 designates a unidirectional loop transmission line on which communication is effected in the direction of the arrow. In addition, numerals 1001–1006 indicate network control processors NCP's each of which performs data transmission control on the transmission line. Each of the NCP's 1001–1006 and the corresponding one of the processors 11–16 are connected bidirectionally.

The processed results (data) of the processors 11–16 are forwarded onto the transmission line 1 via the NCP's 1001–1006. Each of the NCP's 1001–1006 decides whether or not data flowing on the transmission line 1 is necessary for the processor connected thereto, and it sends the data to its own processor only when the necessity has been decided.

Each of the processors 11–16 starts the application program at the point of time at which all the data items required for executing the program stored in the processor have become complete. The started program executes its processes by the use of the data items.

In this system, the processor 14 is assumed to conduct a test according to the method of the present invention, and a CRT console 14000 is connected thereto. Besides, in this system, an external input/output equipment 10001 is connected to the processor 11, and data is fed in from an external process through the external input-/output equipment 10001.

In case the received data includes information indicative of a test mode, each processor executes the program which uses the above data and generates data of a test result on the basis of data of the processed result irrespective of whether the executed program is in the test mode or not.

Figure 2:
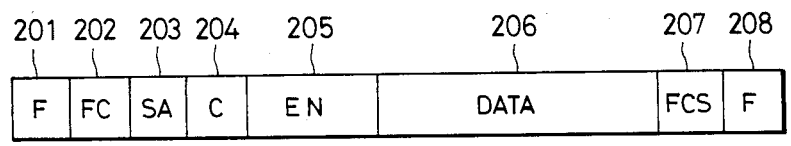
FIG. 2 is a diagram showing a message format which is transmitted.

FIG. 2 shows the format of the data flowing on the transmission line 1. 201(F) denotes a flag which indicates the start of a message, and 202(CC) a content code which corresponds to the content of the data. On the basis of the content code, each NCP decides whether or not the received data is necessary for the processor connected thereto. 203(SA) denotes the address of the NCP having sent the data (sending address), and 204(C) a sequence number required for transmission. 206(DATA) denotes information to be processed by the corresponding application program, 207(FCS) fault detection data, and 208(F) a flag indicating the end of the message. In addition, 205(EN) denotes a sequence number at a processing level, which consists of a processor number and a data generation sequence number. Hereinafter, this shall be called an "event number."

Figure 3:
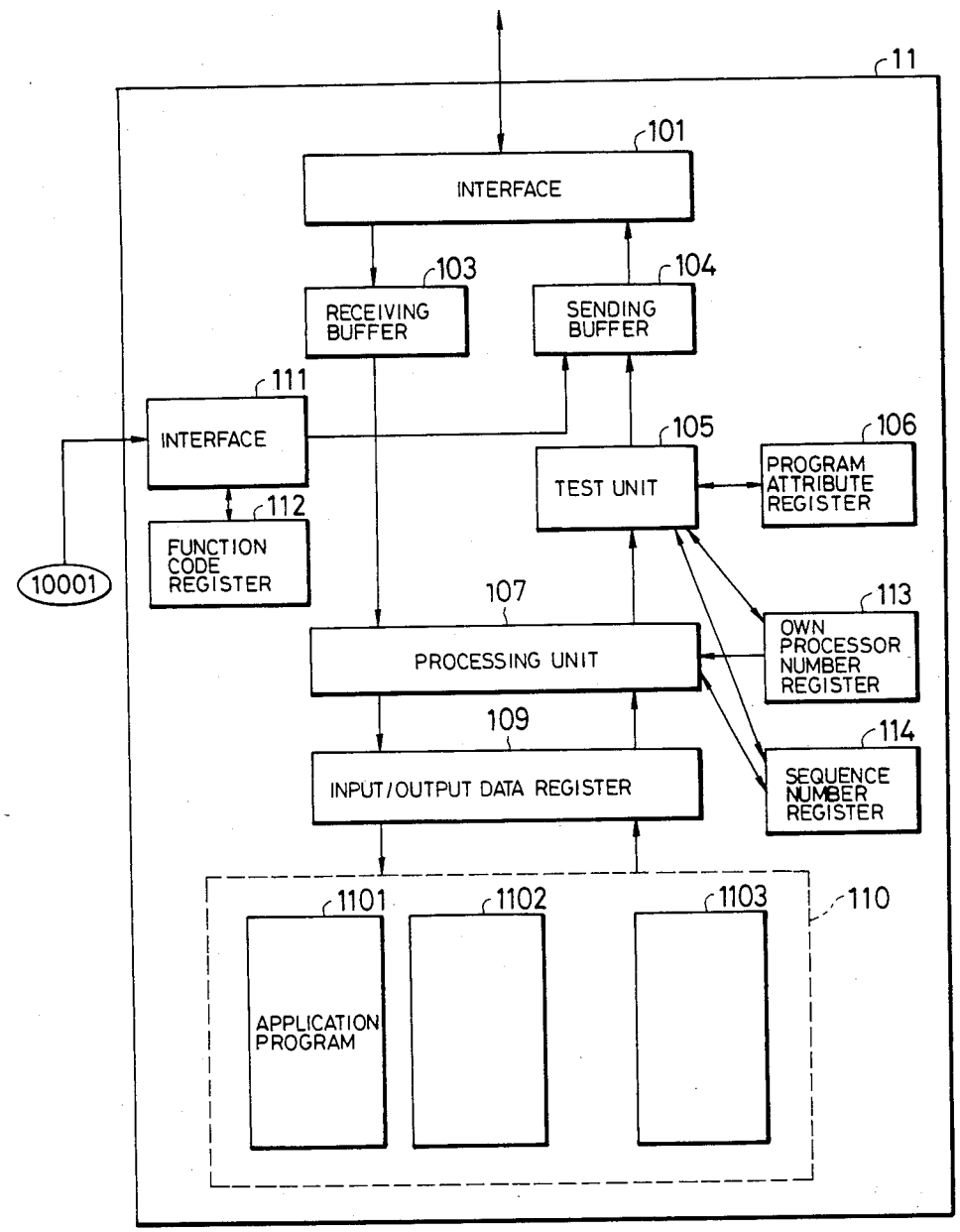
FIG. 3, and FIGS. 4(a) and 4(b) are diagrams showing the internal arrangement of a processor.

FIG. 3 is a diagram showing the internal arrangement of the processor 11 illustrated in FIG. 1, and each of the other processors 12–16 has the same arrangement.

An interface 101 is a unit which transfers data between the NCP 1001 and the processor 11, and through which data received from the NCP is stored in a receiving buffer 103. Besides, the unit 101 transfers data in a sending buffer 104 to the NCP and simultaneously stores the data in the sending buffer 104 in the receiving buffer 103 in a case where it is necessary for the application program loaded in its own processor.

A test unit 105 is a unit which serves to perform a test according to the present invention, and a program attribute register 106 is a table which stores therein information items indicating whether or not the respective application programs are in a test mode. An own processor number register 113 is an area which stores one of the numbers assigned to the respective processors so as to distinguish them from one another, and a sequence number register 114 is an area which is used as a counter for the number of generated data.

A processing unit 107 is a unit which serves to control the execution of the application programs 1101-1103. Besides, an interface 111 is a unit for receiving an input from the external input/output equipment 10001. A content code register 112 is an area in which the content codes of external input data are stored. An input/output data register 109 is an area which serves to store input/output data for each of the application programs.

Figure 4A:
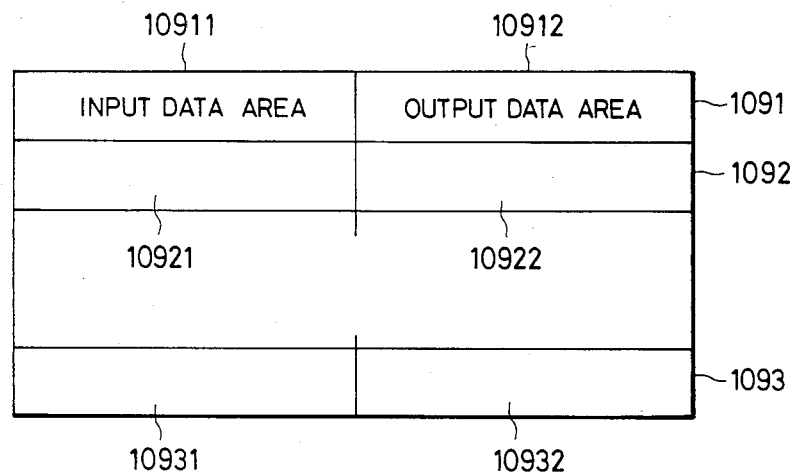

FIG. 4(a) is a diagram showing the contents of the input/output data register 109. The first line 1091 of the area 109 consists of input/output data areas for the application program 1101, and the area 10911 stores the input data of the application program 1101, while the area 10912 stores the processed result thereof. The second area 1092 of the area 109 consists of areas for storing the input/output data of the application program 1102. Thenceforth, input/output data areas are similarly set for the respective application programs.

Figure 4B:
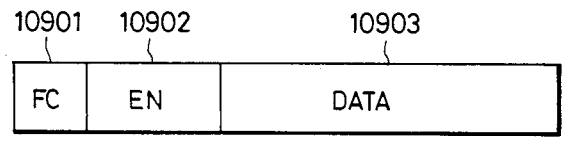

FIG. 4(b) is a diagram showing the format of the data which is stored in the input data area or the output data area. 10901(CC) denotes the content code of the input data or output data, 10902(EN) the event number of the input or output data, and 10903(DATA) the data content of the input or output data.

Now, the test method which is an embodiment of the present invention will be described.

Figure 5A:
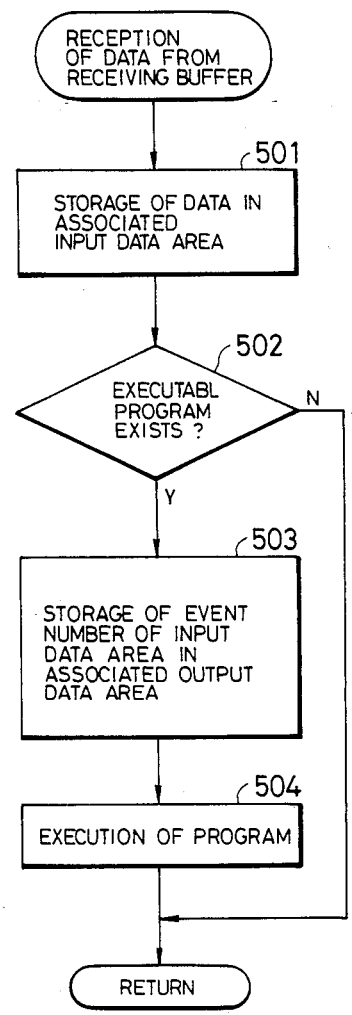
FIGS. 5(a) and 5(b), FIG. 6, and FIGS. 7(a) and 7(b) are diagrams showing processing flows in the processor.
Figure 5B:
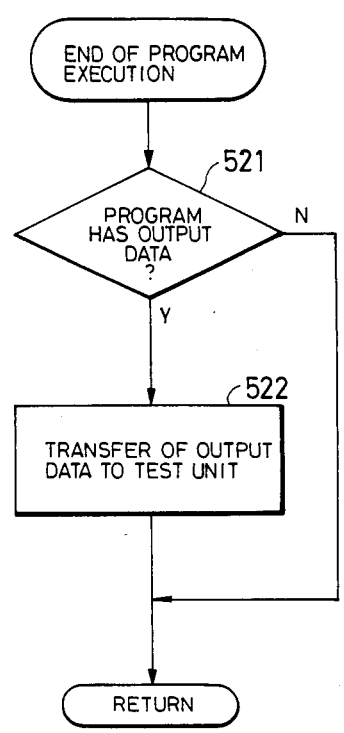

FIGS. 5(a) and 5(b) are diagrams showing processing flows in the processing unit 107. First, processing at the reception of data will be described with reference to FIG. 5(a).

Data is received from the receiving buffer 103, and the content code (CC), event number (EN) and data part (DATA) of the received data register 109 are stored in the input data area within the input/output data area (step 501).

Subsequently, the processing unit decides whether or not an executable application program exists, that is, whether or not input data items necessary for the execution of the program are all stored in the input data areas (10911 etc.) (step 502).

In a case where the executable program exists, the event number area content (EN) of the input data area corresponding to the program is stored in the event number area of the output data area corresponding to the program, without any change (step 503).

Here, in case of the application program which is started with a plurality of input data items, the event number areas of the output data area are taken in the number of the input data items, and the event numbers of all the input data items are stored in the event number areas within the output data area, without any change.

Thereafter, the application programs having become executable are successively started (step 504).

The started application program executes processes on the basis of the data within the input data area corresponding thereto, and sets the results in the output data area corresponding thereto.

When the execution of the started application program has ended owing to the above processes, the processing unit 107 decides whether or not the output data is stored in the output data area (step 521 in FIG. 5(b)). When it is so stored, the data is transferred to the test unit 105 (step 522 in FIG. 5(b)).

Figure 6:
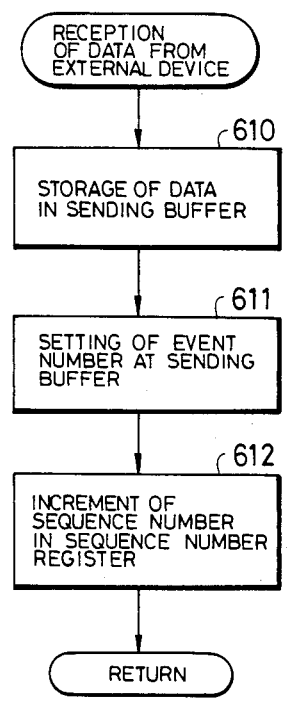

FIG. 6 is a diagram showing the processing of the interface 111. Upon generation of an external input, the interface 111 decides the content code of the input data in view of the content code register 112 and sets the content of the input data as well as the content code decided from the content code register 112, in the sending buffer 104 (step 610).

Next, the unit 111 sets the content of the own processor number register 113 and the content of the sequence number register 114 in the event number area within the sending buffer 104 (step 611). Thereafter, the content of the sequence number register is incremented by "1."

Now, the processing of the test unit 105 after the execution of the application program will be described with reference to FIGS. 7(a) and 7(b).

Figure 7A:
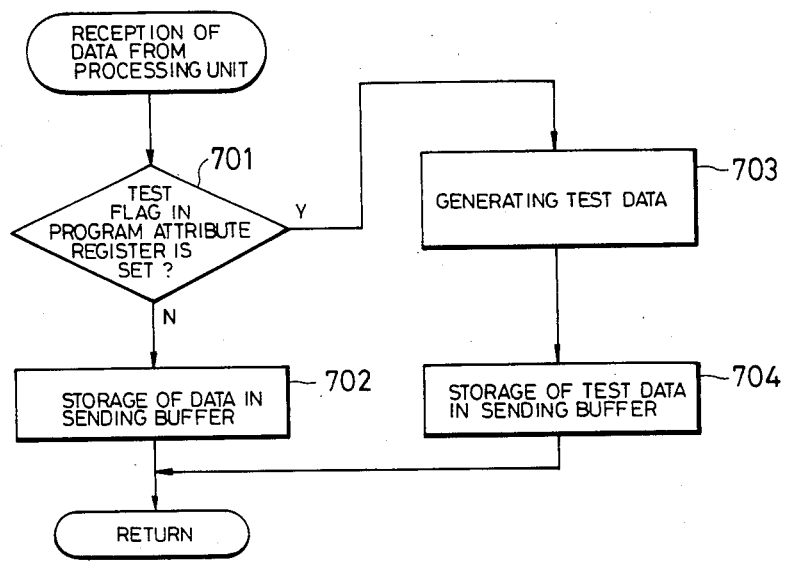

The test unit 105 having received the output result of the application program from the processing unit 107 decides whether or not the application program is in the test mode, from the set status of a test flag in the program attribute register 106, and when the program is not in the test mode, the test unit stores the data received from the processing unit as it is, in the sending buffer 104 (steps 701 and 702 in FIG. 7(a)).

In contrast, when the program is in the test mode, the test unit 105 generates test data whose data part has the data received from the processing unit 107 (step 703) and stores it in the sending buffer 104 (step 704). The data in the sending buffer is arranged in the transmission format in the interface 101, and then transferred onto the transmission line 1.

Figure 7B:
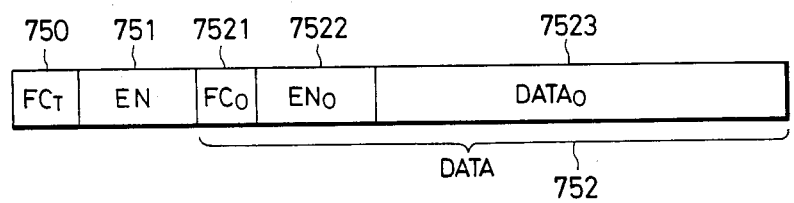

FIG. 7(b) shows the format of the test data which is generated at the processing step 703. In a content code area 750, a content code $CC_T$ indicative of the test data is set. In an evett number area 751, the content of the own processor number register 113 and that of the sequence number register 114 are set.

After the event number setting process, the test unit 105 increments the content of the sequence number register by "1." In the data part 752, the data contents received from the processing unit 107, namely, the content code 7521, data part 7523 and event number 7522 of the application program output are set as they are.

Owing to the processes of the processing unit 107 and the test unit 105 stated above, the developed application program is loaded in the processor as the test mode, and the test flag in the program attribute register is set, whereby during the on-line operation, the test can be started using on-line data without exerting any influence on the system. Besides, the output data of the program executed for the test is reconstructed by the test unit 105 into the test data ( content code $CC_T$), which is delivered onto the transmission line 1, so that any of the processors can receive the test data and analyze the result of the test start.

Now, the process of gathering the test data will be described with reference to FIGS. 8(a) and 8(b) and FIGS. 9(a) to 9(c).

Figure 8A:
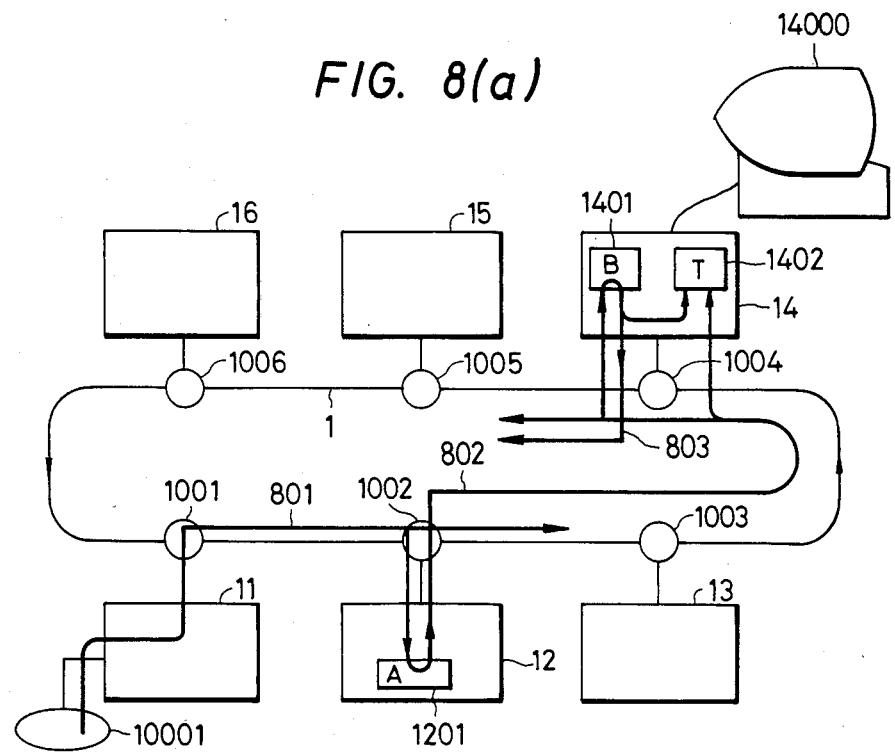

FIG. 8(a) is a diagram showing the flow of data between the system architecture and the application program. Here, let's consider a case where a program B (1401) which executes processes by the use of the output results of an on-line operation application program A (1201) in the processor 12 is loaded in the processor 14 with the test mode set therefor so as to be tested using on-line data.

Figure 8B:
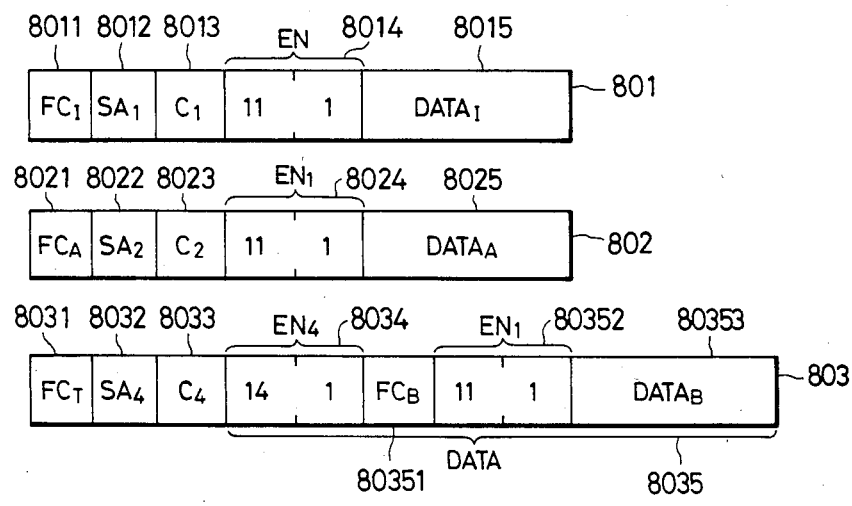

The interface 111 in the processor 11 accepts input data from the external input equipment 10001, and generates data 801 which includes a content code $CC_I$ (8011 in FIG. 8(b)), an event number (8014) consisting of a processor number 11 and a data generation sequence number 1, and an external input data content $DATA_I$ (8015), in accordance with the flow illustrated in FIG. 6. This data is transferred onto the transmission line 1 through the NCP 1001.

In the data format 801 shown in FIG. 8(b), $SA_1$ (8012) denotes the address of the NCP 1001, and $C_1$ (8013) denotes a sequence number required for transmission. The processor 12 receives the data 801 through the NCP 1002, and the processing unit 107 thereof starts the application program A (1201) in accordance with the flow of FIG. 5(a).

The application program A executes a process by the use of the data content $DATA_I$ (8015) within the data 801, and sets processed result data $DATA_A$ as well as a content code $CC_A$ indicative of the content thereof in the output data register of the input/output data area 109.

This processed result is transferred onto the transmission line 1 as data in a format shown at numeral 802 in FIG. 8(b), through the processing unit 107, interface 101 and NCP 1002. Besides, in an event number area 8024, the content of the event number of the data 801 as left intact is set by the processing unit.

Figure 9A:
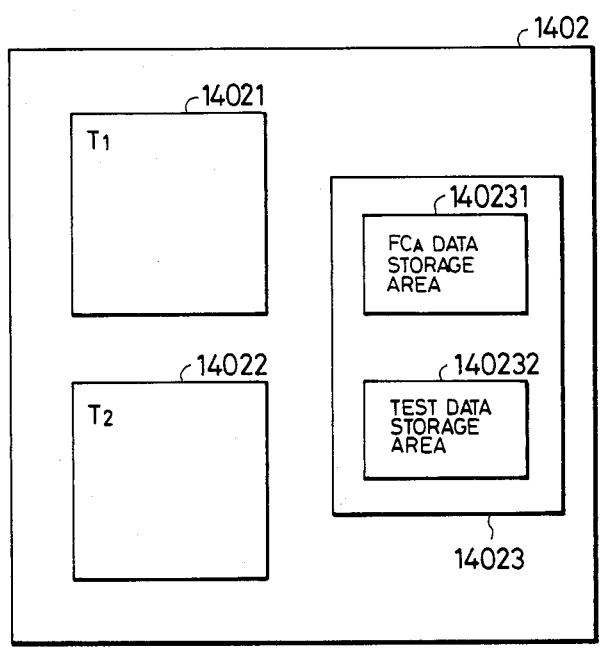

The processor 14 is loaded with a program T (1402) for gathering the test start results, in addition to the program B (1401) in the test mode to be started with the data 802. FIG. 9(a) shows the scheme of the data gathering program T.

The program T is composed of a program $T_1$ (14021) which is started with the start data 802 of the program B having the content code $CC_A$, a program $T_2$ (14022) which is started with test data having a content code $CC_T$, and a data storage area 14023. The data storage area 14023 consists of an area 140231 for storing the input data of the program B, and an area 140232 for storing the output data thereof.

Each of these areas is constructed of a data storage buffer corresponding to a previously appointed number of data items, and it has a cyclic buffer arrangement in which, when the number is exceeded, an older data item stored is erased earlier.

The program B in the processor 14 is started with the output data 802 of the program A as shown in FIG. 8(a), executes a process by the use of the content $DATA_A$ (8025) within the data 802, and outputs processed result data $DATA_B$ as well as a content code $CC_B$ indicating the content thereof. Since the program B is in the test mode, the test unit 105 within the processor 14 accepts the output data and reconstructs it into test data 803, which is delivered.

Meanwhile, the program $T_1$ 14021 in the processor 14 is also started with the data 802 and executes the process of its own (refer to FIG. 8(a)). The processing flow of the program $T_1$ is shown in FIG. 9(b).

The program $T_1$ stores the content code $CC_A$ (8021), event number $EN_1$ (8024) and data part content $DATA_A$ (8025) within the input data 802, in the $CC_A$ data storage area 140231 (step 901).

Subsequently, it is decided whether or not data having the same event number as that of the current input data 802 has already been stored in the test data storage area 140232 (step 902). When such data has been stored, the data applied this time and the data in the test data storage area having the same event number as that of the former are displayed as test result information on the CRT console 14000 (step 903).

The program $T_2$ (14022 in FIG. 9(a)) is started with the test data 803 (refer to FIG. 8(b)), and executes the process of its own. The processing flow of the program $T_2$ is shown in FIG. 9(c). The program $T_2$ stores a content code $CC_B$ (80351), event number $EN_1$ (80352) and data content $DATA_B$ (80353) within the data part 8035 of the input data 803, in the test data storage area (140232 in FIG. 9(a)) (step 950).

Subsequently, it is decided whether or not data having the same event number as the event number within the data part 8035 of the current input data 803 has already been stored in the $CC_A$ data storage area 140231 (step 951). When such data has been stored, the data items in the $CC_A$ data storage area and the test data storage area having the same event number are displayed as test results on the CRT console 14000 (step 952).

As stated above, according to the present embodiment, a developed program is loaded as a test mode program in any desired processor, whereby during an on-line operation, the program can be started for a test by the use of on-line data without affecting the system. Moreover, the input data of the program and the output result corresponding thereto can be gathered in any desired processor.

The embodiment has referred to only the case where the program is startd for the test with the on-line data. Further, an area for storing the normal output pattern of an applicable program and an output fault detection flag are set in the program attribute register (106 in FIG. 3), and the test unit (105 in FIG. 3) is endowed with the function of resetting a program attribute flag when output values for input data items in a fixed period or in a fixed number since the loading of the test mode program have been found to be faultless as compared with the aforementioned normal output pattern, whereby the program loaded in the processor is permitted to automatically come into an on-line operation after the test with the on-line data of the program has ended.

Figure 10:
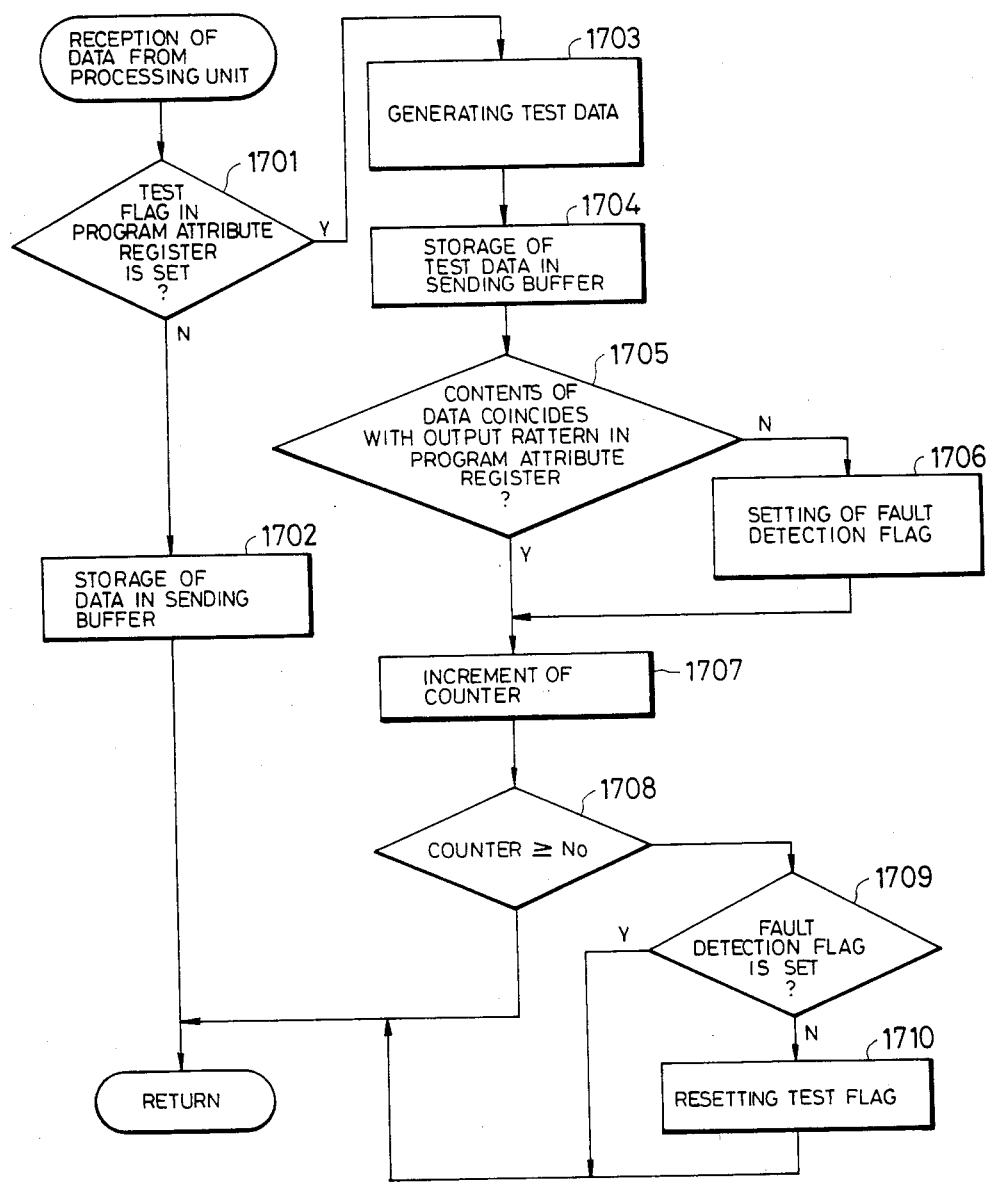
FIG. 10 is a diagram for explaining a program automatic-test process in a test unit.

By way of example, FIG. 10 shows the processing flow of the test unit in the case where input data items in a fixed number ($N_0$) are subjected to the test. This example illustrates a case where a program is deemed faultless when the contents of program output data have agreed with a normal output pattern. Steps 1701–1704 are the same processes as those shown as the steps 701–704 in FIG. 7(a). After storing test data in the sending buffer (step 1704), whether or not the contents of program output data coincide with an output pattern in the program attribute register is decided (step 1705). In case of non-coincidence, an output fault detection flag in the program attribute register is set (step 1706). Thereafter, the input data counter corresponding to the program started this time is incremented by "1" (step 1707).

Subsequently, the counter value is compared with a predetermined value $N_o$ (step 1708). When the counter value is equal to or greater than the value $N_o$, the fault detection flag is decided (step 1709). Unless the fault is set, a test flag in the program attribute register is reset (step 1710).

Owing to the foregoing processes, the program loaded in the processor is not immediately operated, but it is automatically tested under on-line circumstances and is permitted to come into the on-line operation only when it is found to be faultless as a result of the test.

In the embodiment, the test program and the data gathering program have been set in the processor 14. However, these programs can be set in any desired processor other than the processor 14 so as to conduct the test. Moreover, the test program and the data gathering program can be set in different processors so as to conduct the test.

Besides, in the embodiment, the unidirectional loop transmission line has been mentioned as an example of the common transmission line. Needless to say, however, a common transmission line in any other form may be used as long as it is a data transmission medium.

As preferable aspects of performance of the present invention, the following tems can be listed:

(1) In a decentralized processing system wherein the series of processes of one task are executed in a decentralized fashion by a plurality of processors connected to a common transmission line; a decentralized processing system characterized in that each processor comprises means to decide whether or not an application program loaded in its own processor is in a test mode, and means to receive data of a processed result of said application program and to generate and deliver data of a test result, whereby when a decided result of the decision means is the test mode, the data of the test result is delivered onto said common transmission line by the data generation and delivery means.

(2) A decentralized processing system as defined in Item (1), wherein a program which gathers input data of the test mode program and test result data corresponding to the input data and which displays them after associating them to each other is further set in any of the processors.

(3) A decentralized processing system as defined in Items (1) and (2), wherein each processor further includes therein an output pattern preset in correspondence with the test mode program, and a program is set therein according to which the test result data is compared with the output pattern, the test mode of said processor being released in accordance with a result of the comparison.

As described above, according to the present invention, in a system wherein the series of processes of one task are decentralizedly executed by a plurality of processors connected to a common transmission line, developed application programs can be tested under on-line circumstances by any desired processor, and the results of the tests can be gathered, so that the efficiency of the program tests is enhanced. Besides, only when the result of the test has been recognized as normal will the program be brought into an on-line operation, so that the reliability of a system rises.

We claim:

1. Distributed processing method for a processing system including a plurality of processing means connected by a common transmission medium, comprising the steps of:
   storing, in each processing means, information which represents whether or not a program to be executed therein is in a test mode;
   when an executable program exists in a processing means, executing the program in said processing means on data received on said common transmission medium;
   deciding in a processing means, on the basis of said stored information therein, whether or not a program executed therein is in a test mode;
   producing test data in a processing means when it is decided that a program executed therein on data received on said common transmission medium is in a test mode; and
   sending produced test data from said processing means to the common transmission medium so that the test data is received in at least one other one of said processing means.

2. Distributed processing method according to claim 1, which further includes deciding in a processing means, on the basis of test data for an executed program in a test mode, whether or not an execution result of the program is normal.

3. Distributed processing method according to claim 2, which further includes changing the stored information in a processing means so that the information represents that a program to be executed therein is not in a test mode, when it is decided on the basis of test data that the execution result of the program is normal.

4. Distributed processing method according to claim 1, which further includes sending data including an event number denoting a sequence number at a processing level from a processing means to said common transmission medium, executing a program in said processing means based on data received from said common transmission medium, and producing in said processing means data in which the event number of the received data is added to a result of the program execution.

5. In a distributed processing system including a plurality of processing means connected by a common transmission medium, the improvement comprising:
   means for storing in each processing means information which represents whether or not a program to be executed therein is in a test mode;
   means responsive to existence of an executable program in a processing means for executing the program in said processing means on data received on said common transmission medium;
   means responsive to said stored information in a processing means for determining whether or not a program executed therein is in a test mode;
   means for producing test data in a processing means when it is determined that a program executed therein on data received on said common transmission medium is in a test mode; and
   means responsive to said producing means for sending produced test data from said processing means to the common transmission medium so that the test data is received in at least one other one of said processing means.

6. Distributed processing system according to claim 5, which further includes means for deciding in a processing means, on the basis of test data for an executed program in a test mode, whether or not an execution result of the program is normal.

7. Distributed processing system according to claim 6, which further includes means for changing the stored information in a processing means so that the information represents that a program to be executed therein is not in a test mode, when it is decided on the basis of test data that the execution result of the program is normal.

8. Distributed processing system according to claim 5, which further includes means for sending data including an event number denoting a sequence number at a processing level from a processing means to said common transmission medium, means for executing a program in said processing means based on data received from said common transmission medium, and means for producing in said processing means data in which the event number of the received data is added to a result of the program execution.

* * * * *